United States Patent [19]

Bonyhard

[11] 3,786,446

[45] Jan. 15, 1974

[54] SINGLE WALL DOMAIN CODING CIRCUIT

[75] Inventor: Peter Istvan Bonyhard, Edison, N.J.

[73] Assignee: Bell Telephone Laboratories, Incorporated, Murray Hill, N.J.

[22] Filed: Sept. 12, 1972

[21] Appl. No.: 288,255

[52] U.S. Cl. 340/174 TF, 340/174 EB, 340/174 SR

[51] Int. Cl. ........................ G11c 19/00, G11c 11/14

[58] Field of Search ............................... 340/174 TF

[56] References Cited

UNITED STATES PATENTS

| | | | |
|---|---|---|---|
| 3,710,356 | 1/1973 | Bobeck | 340/174 TF |
| 3,701,125 | 10/1972 | Chang et al. | 340/174 TF |
| 3,702,995 | 11/1972 | Bobeck et al. | 340/174 TF |

*Primary Examiner*—James W. Moffitt
*Attorney*—H. M. Shapiro

[57] ABSTRACT

A number of field access, magnetic bubble propagation channels are connected to a single magnetoresistance detector by a binary coded interconnection circuit. The circuit is operative to retard bubbles in ones of the channels with respect to others while laterally expanding those which are not retarded. The latter provide improved signal levels.

9 Claims, 6 Drawing Figures

SINGLE WALL DOMAIN CODING CIRCUIT

FIELD OF THE INVENTION

This invention relates to magnetic information storage apparatus, and more particularly to such apparatus in which information is stored as patterns of single wall domains commonly known as magnetic "bubbles."

BACKGROUND OF THE INVENTION

A. H. Bobeck U.S. Pat. No. 3,534,347, issued Oct. 13, 1970, discloses a bubble memory in which channels for the movement of bubbles in a domain layer are defined by magnetic elements typically of magnetically soft material. A magnetic field reorienting in the plane of the layer generates pole patterns which effect the bubble movement in what has become known as a "field access" mode of operation. A typical geometry for the elements comprises a periodic pattern of bar and T-shaped elements responsive to a constant drive field reorienting by rotation or as a pulsed field in orientations consecutively offset radially from one another.

U.S. Pat. No. 3,618,054, of P. I. Bonyhard, U. F. Gianola, and A. J. Perneski, issued Nov. 2, 1971, describes a memory organization for a field access, bubble memory. The organization includes a plurality of permanent recirculating loops, called "minor" loops, and a single accessing loop, called a "major" loop. In operation, selected stored information is transferred from the minor loops to the major loop for circulation past a single read-write position before being restored to vacancies created by that transfer and synchronously circulated in the minor loop responsive to the driving in-plane field.

This "major-minor" organization exhibits an access time determined by the number of positions (M) in a minor loop and the number of positions (N) in the major loop. No bit need be moved more than MN positions. On the average, a bit moves MN/2 positions determining an access time of MN/2 cycles of the in-plane field.

Another memory organization provides for a coding arrangement which passes outputs from the minor loops electrically in parallel to an increased number of detectors rather than to a single detector via the major loop. Of course, the more detectors used, the faster the access time. But increased numbers of detectors require increased numbers of external connections which decrease reliability and increase cost. Alternatively, numbers of detectors can be employed in an electrically in-series arrangement. Noise considerations, on the other hand, limit such an arrangement to relatively few detectors.

Moreover, it has been found attractive to increase the volume of a domain prior to detection in order to increase the signal level generated by a domain. Copending applications Ser. No. 160,841, filed July 8, 1971 and now U.S. Pat. No. 3,723,716, for A. H. Bobeck and H. E. D. Scovil and Ser. No. 201,755, filed Nov. 24, 1971 and now U.S. Pat. No. 3,702,995, for A. H. Bobeck, F. J. Ciak and W. Strauss describe a field access bubble arrangement defined by a "fine-grained" pattern of closely spaced magnetic elements which permit enlarged domains to move along a channel in response to a reorienting in-plane field. Such a fine-grained pattern is employed to define an "expansion"-magneto-resistance detector, as disclosed in the former of these two applications, by employing increasing numbers of elements in consecutive stages preceding a detection stage.

BRIEF DESCRIPTION OF THE INVENTION

The present invention is directed at a read-out arrangement for a number of bubble channels (viz: minor loops) in which a multistage channel of fine-grained elements interconnect output positions of the channels and a magneto-resistance detector. A number of electrical conductors couple the domain layer in a binary coded fashion. Each one of the conductors is aligned with a pair of stages of the fine-grained pattern and is operative, when pulsed, to retard coded bits being moved with respect to that pattern in response to a reorienting in-plane field. In each instance, domains not so retarded expand laterally within each stage. Consecutive operations of this type are operative to enlarge a domain from its normal operative size to a size commensurate with the lateral dimension occupied by all the channels for detection or even larger.

In one specific embodiment, closely spaced chevron elements are employed as the fine-grained interconnection circuit and the in-plane field reorients by rotation.

DETAILED DESCRIPTION

Figure 1:
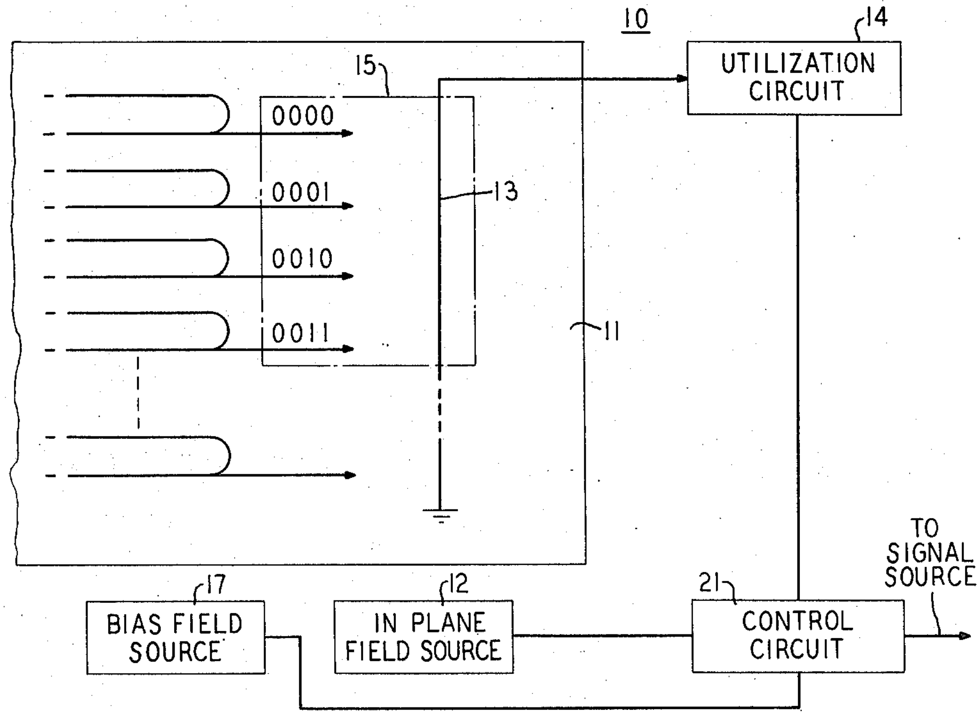
FIG. 1 is a schematic illustration of a bubble arrangement including an interconnection circuit in accordance with this invention.

FIG. 1 shows a bubble read-out arrangement 10 in accordance with this invention. The arrangement comprises a layer 11 of material in which bubbles can be moved.

A plurality of bubble recirculating channels is defined in layer 11 by patterns of magnetic elements for moving domains in response to a rotating in-plane magnetic field. A source of such a field is represented by block 12 in FIG. 1. The channels are indicated by a plurality of generally horizontal curved lines designated in binary fashion by "output" arrows 0000, 0001, 0010, 0011 from top to bottom as viewed in the figure.

A vertical line 13 shown connected between a utilization circuit represented by block 14 in FIG. 1 and ground indicates a common magneto-resistance element to which the outputs of the channels are connected by means of an interconnection encoding circuit.

Figure 2:
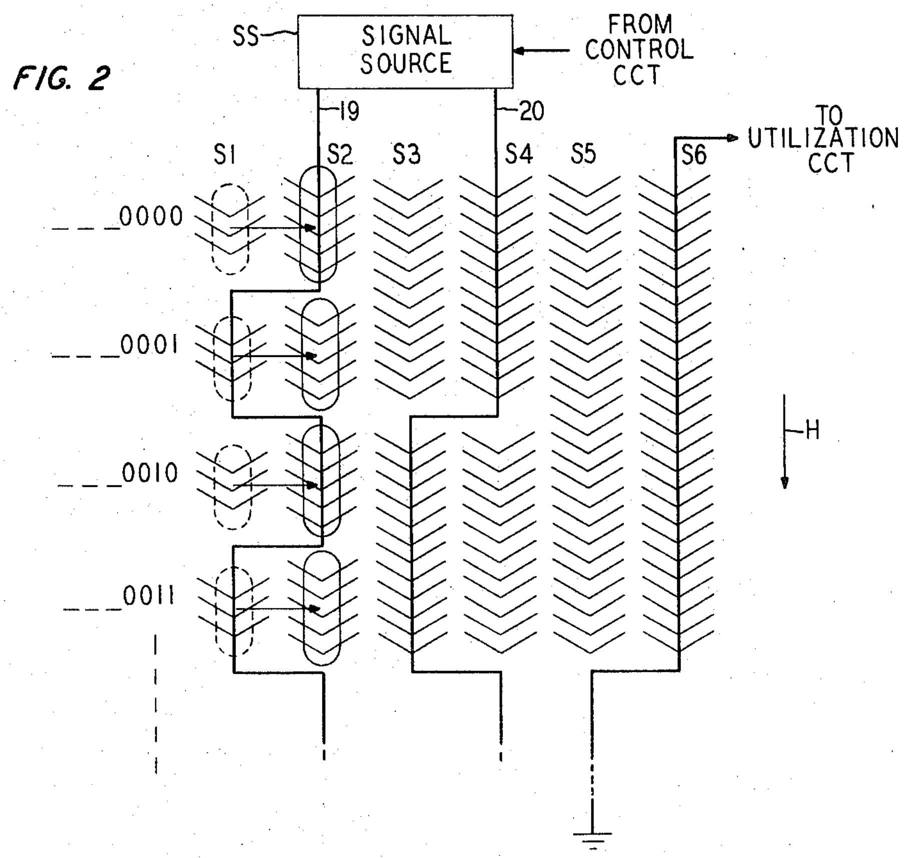
FIGS. 2 through 6 are schematic illustrations of a portion of the interconnection circuit of the arrangement of FIG. 1, showing magnetic states therein during operation.

FIG. 2 is an enlargement of area 15 of FIG. 1 showing that portion of a fine-grained interconnection encoding circuit between four channels of FIG. 1 and the common magneto-resistance element. The circuit can be seen to comprise six stages designated S1 to S6 from left to right as viewed in FIG. 2. Stage S1 can be seen to comprise four distinct sets of chevrons correspinding to the four representative channels as shown. Stage S2 similarly comprises four distinct sets of chevrons. But the number of elements in each set of stage S2 is increased over the number in the corresponding set of stage S1 allowing any domain moving from stage S1 to S2 to expand laterally with respect to an axis of movement defined between the originating channel and the magneto-resistance element.

When the in-plane field is directed downward as represented by arrow H in FIG. 2, a domain in any one of the stages occupies a position about the center of the chevron pattern as is well known. For illustrative purposes we will adopt the convention that a circle (or oval as shown) represents a bit of information and, for convenience, will treat that bit as a domain. Of course, in any practical arrangement, the presence and absence of a domain represents a binary one and a binary zero, respectively. In any case, the condition shown in stage S1 of FIG. 2 represents the information 1111, and any bit may be imagined to represent a binary zero by imagining the oval to be absent. The circles in the figure, in accordance with the convention, represent domains with normal operating diameters determined by a familiar bias field supplied by a source represented by block 17 of FIG. 1. Inasmuch as stage S2 has additional chevron elements, any domain which advances to stage S2, as the in-plane field reorients, enlarges vertically (laterally with respect to the axis of movement) even in the presence of a constant bias field.

We will illustrate the addressing of channel 0001. Addressing is carried out by coded pulses applied to a set of electrical conductors 19, 20, — which couple layer 11 at the interconnection circuit in a binary coded manner. To be specific, conductor 19 couples layer 11 at positions corresponding to the chevron sets of stages S1 and S2. The conductor is connected to a signal source represented by block SS in FIG. 2 operative under the control of a control circuit 21 of FIG. 1 to apply a pulse to conductor 19. We will adopt the convention that a positive pulse delays the advancement to the right, as viewed in FIG. 2, of all domains coupled to the conductor when pulsed. For the selection of channel 0001, no pulse is applied to conductor 19 when stage S1 is occupied.

During the next cycle of the in-plane field when the field is next oriented downward as indicated in FIG. 2, all domains previously in stage S1 advance to stage S2. The domains are shown expanded in stage S2 in FIG. 2, the preceding (viz: the assumed initial) position for the domains being indicated by the broken circles in that figure.

A pulse is now applied to conductor 19 retarding the domains corresponding to channels 0000 and 0010, according to the coupling shown in FIG. 2, while the next cycle of the in-plane field advances the domains corresponding to channels 0001 and 0011. The latter domains are shown further expanded in stage S3 of FIG. 3, their preceding positions again being indicated by the broken ovals in FIG. 3. Stage S3 now has two expanded domains one of which is the selected domain from channel 0001. Stage S2 includes two (expanded) domains from nonselected channels 0000 and 0010 and indicates the prior positions of the two domains in stage S3 at this juncture.

Figure 3:
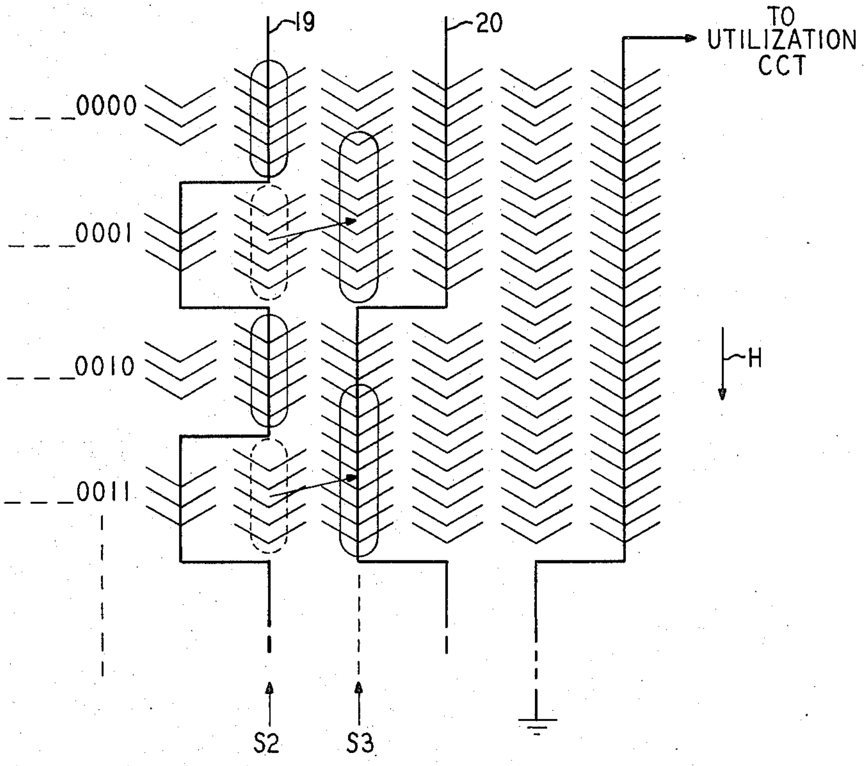
Figure 4:
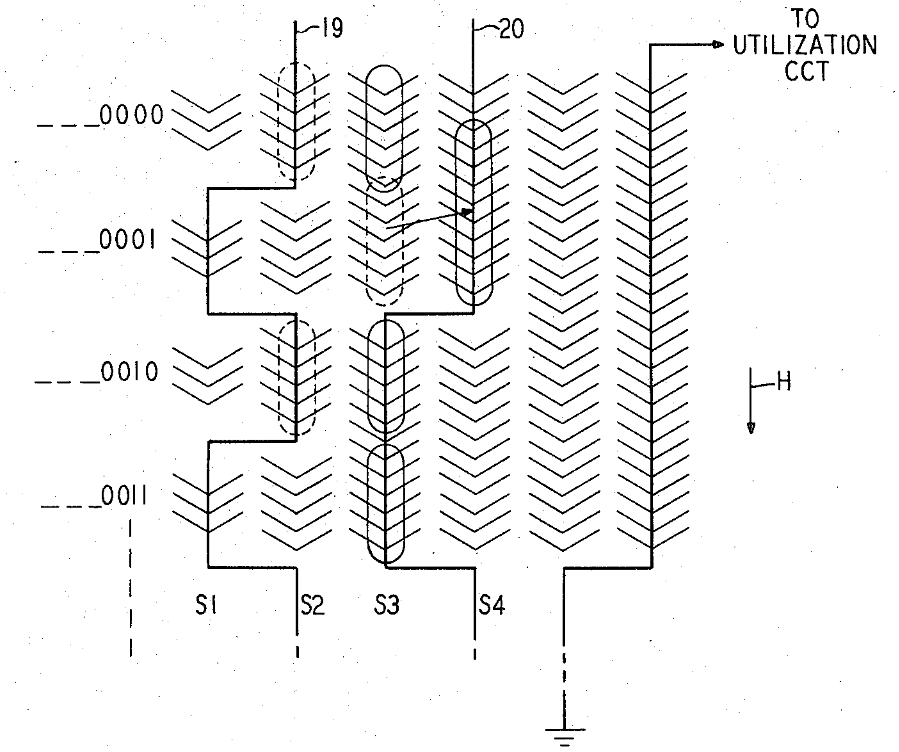

Conductor 20 of FIG. 3 is now pulsed for retarding the domain originating in channel 0011 and now occupying stage S3. FIG. 4 shows the magnetic condition in layer 11 at the interconnection circuit when the in-plane field next reorients to the reference downward direction. Again, the solid ovals indicate present positions of a domain; the broken ovals indicate previous positions. The figure shows that only the domain which originated in channel 0001 reaches stage S4 at this juncture. The domains from the nonselected channels are delayed one stage with respect to the position of the domain (or bit) from the selected channel adjusting their lateral extent to allow room for one another as is clear from the figure.

Since only four channels are being considered in the illustrative operation, only two addressing conductors are necessary, the desired result being achieved in stage S4. Of course, in practice many more than four channels are employed, in which case increased numbers of binary coded conductors are employed and the desired selection is achieved over a greater number of stages. Regardless of the number of channels actually present, the nonselected information is delayed only one or two stages during the entire selection operation.

Figure 5:
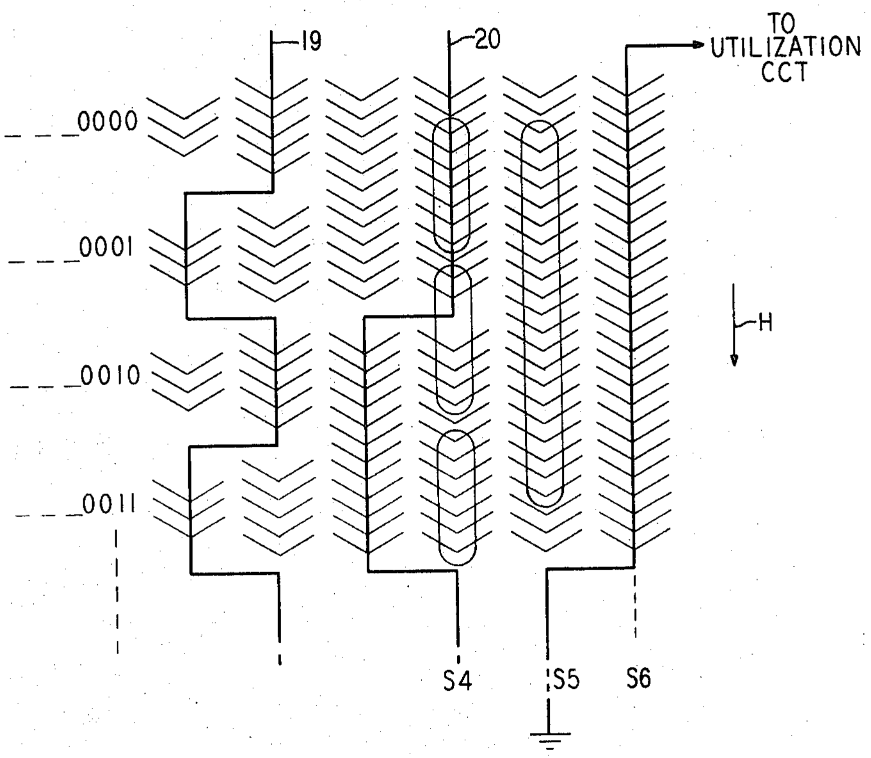
Figure 6:
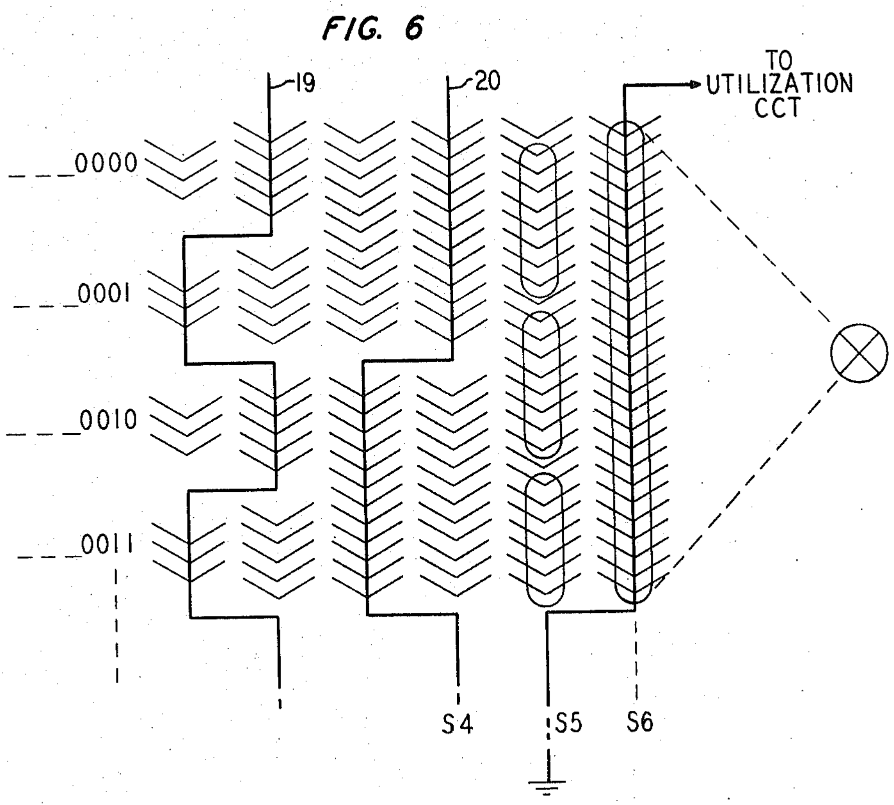

During each cycle of the in-plane field, all domains advance one stage to the right unless retarded by the coded conductors when pulsed. FIG. 5 shows the domain during a next in-plane field cycle. FIG. 6 shows the arrival of the selected information at the magneto-resistance detector in stage S6. The domain in FIG. 6 is shown to occupy the entire vertical length of stage S6, a length corresponding to that occupied by all the originating channels. Utilization circuit 14 is operative under the control of control circuit 21 of FIG. 1 to accept signals at this time and to ignore signals during subsequent cycles when nonselect information reaches stage S6 thus taking advantage of the enlarged domain for effecting increased signal levels.

In response to subsequent rotations of the in-plane field operative to advance subsequent sets of data from the domain channels, information moves to the right in FIG. 6 into, for example, a domain annihilation circuit. Such a circuit may comprise consecutive stages including increasingly smaller numbers of elements as indicated by the converging broken lines to the right in the figure. The encircled X represents the point of domain annihilation implemented by well-known means if such annihilation be deemed desirable.

The delay of nonselected information by one or two stages dictates a minimum spacing of three stages for consecutive sets of data. In practice, information is spaced apart four stages for convenience in a binary system. Also in practice, channels from different layers 11 are interconnected in a bridge arrangement to share a single detector, in which instance an output appears during each cycle (or two) of the in-plane field in accordance with well-understood system considerations.

What has been described is considered merely illustrative of the principles of this invention. Therefore, varied embodiments can be devised by those skilled in the art in accordance with those principles within the spirit and scope of this invention as encompassed by the following claims.

What is claimed is:

1. Apparatus comprising a layer of material in which single wall domains can be moved, means for defining in said layer a plurality of channels for the movement of said domains, and expansion means operative to move a domain from a selected one of said plurality of channels from an output position in each of said channels along an axis to a detection position, said last-mentioned means comprising a pattern of magnetic elements extending between each of said output positions and said detection position and defining a plurality of stages therebetween for the movement of said domains in response to a magnetic field reorienting in the plane of said layer, and a plurality of electrical conductors coupled to said layer in a coded arrangement such that each of said conductors is associated with two of said stages for retarding coded ones of said domains being moved along said axis, said conductors being operative responsive to external signals to retard coded ones of said domains, said pattern being operative to expand laterally with respect to said axis domains not so retarded.

2. Apparatus in accordance with claim 1 wherein said pattern is fine-grained and said coded arrangement is organized in a binary coded fashion.

3. Apparatus in accordance with claim 2 wherein each of said conductors is associated with a pair of consecutive stages.

4. Apparatus in accordance with claim 3 wherein said stages include increasing numbers of said magnetic elements responsive to said reorienting field to expand said domain.

5. Apparatus in accordance with claim 4 wherein coded ones of said elements in said stages are omitted for limiting the extent of lateral expansion of domains therein.

6. Apparatus comprising a layer of material in which single wall domains can be moved, means for defining in said layer a multistage channel for moving said domains along an axis from an input to an output stage in response to a reorienting in-plane field, each of said stages comprising a fine-grained pattern of elements arranged laterally with respect to said axis, and a plurality of electrical conductors each coupled to a pair of consecutive ones of said stages in a coded manner, said conductors being operative when pulsed to retard domains being advanced there-across in response to said in-plane field.

7. Apparatus in accordance with claim 6 in which said input stage is adapted to receive a plurality of domains in parallel.

8. Apparatus in accordance with claim 7 wherein each of said conductors is coupled to a pair of consecutive ones of said stages in a binary coded manner.

9. Apparatus in accordance with claim 7 wherein coded ones of said elements in said stages are omitted for limiting the extent of lateral expansion of domains therein.

* * * * *